US006342153B1

(12) United States Patent
Guan et al.

(10) Patent No.: US 6,342,153 B1
(45) Date of Patent: Jan. 29, 2002

(54) PILLARED CLAY CATALYSTS FOR HEAVY OIL CATALYTIC PYROLISIS PROCESS AND THE PREPARATION METHOD THEREOF

(75) Inventors: Jingjie Guan; Xieqing Wang; Zhiqing Yu; Zhengyu Chen; Qinglin Liu; Yi Liao, all of Beijing (CN)

(73) Assignees: China Petrochemical Corporation; Research Institute of Petroleum Processing, both of Beijing (CN)

( * ) Notice: Subject to any disclaimer, the term of this patent is extended or adjusted under 35 U.S.C. 154(b) by 0 days.

(21) Appl. No.: 09/219,119

(22) Filed: Dec. 23, 1998

(30) Foreign Application Priority Data

Dec. 23, 1997 (CN) ............................................. 97122089

(51) Int. Cl.$^7$ ......................... C10G 11/02; C10G 11/04; B01J 21/16
(52) U.S. Cl. ...................... 208/118; 208/113; 208/120; 208/122; 502/63; 502/64; 502/68; 502/71; 502/77; 502/79; 502/80; 502/84
(58) Field of Search ............................. 502/63, 64, 68, 502/71, 77, 79, 80, 84; 208/113, 118, 120, 122

(56) References Cited

U.S. PATENT DOCUMENTS

| 4,176,090 A | | 11/1979 | Vaughan et al. | |
| 4,742,033 A | * | 5/1988 | Harris et al. | 502/68 |
| 4,845,066 A | * | 7/1989 | Fahey et al. | 502/84 |
| 4,968,652 A | * | 11/1990 | Johnson et al. | 502/63 |
| 5,183,559 A | * | 2/1993 | Kirker et al. | 208/119 |
| 5,202,295 A | * | 4/1993 | McCauley | 502/65 |
| 5,308,812 A | * | 5/1994 | Salem et al. | 502/63 |
| 5,414,185 A | * | 5/1995 | Salem et al. | 585/721 |

FOREIGN PATENT DOCUMENTS

| EP | 0197012 A2 | 10/1986 |
| JP | 101990 A | 10/1987 |
| JP | 105686.0 | 3/1989 |
| JP | 104718 | 5/1990 |
| JP | 058382 A | 2/1992 |
| JP | 107080 A | 8/1995 |
| JP | 109775.1 | 11/1995 |
| JP | 103411.4 | 10/1997 |

OTHER PUBLICATIONS

Guan, J. et al; Derwent Publications, Ltd.; China Petrochemical Ind. Gen.Co. "Laminar column molecular sieve catalyst of high yield olefin"; Aug. 23, 1995.

Guan, J. et al; "Pillared Interlayered Rectorite Microspheric Cracking Catalyst"; vol. 3, pp. 1253 to 1261; Sep. 15, 1991.

* cited by examiner

*Primary Examiner*—Steven P. Griffin
*Assistant Examiner*—Christina Ildebrando
(74) *Attorney, Agent, or Firm*—Birch, Stewart, Kolasch & Birch, LLP

(57) ABSTRACT

Pillared clay catalysts for converting heavy oil or residual feedstock into maximum ethylene, propylene and butylene products comprises 30–75 wt % special pillared clays prepared by aluminum pillaring agents of high alkaline degree, 10–40 wt % inorganic oxide bonding agents, 0–30 wt % ZRP series high silicon zeolites with pentasil structure or Y-type zeolites, 0–10 wt % modified compositions of Mg, Al, K, P, Sn and polyethylene gycol, or 0–50 wt % Kaolinite matrix. The catalysts are prepared by mixing slurries, spray drying to form microspheric shapes, pillaring reaction and adding modified components. The catalysts have high catalytic activities, good light olefin selectivities and attrition resistance index. The products are suitable to be used as catalysts for hydrocarbon conversion, including CPP-catalyst for catalytic pyrolysis processes to convert heavy oil into ethylene and propylene, MIO-catalyst for yielding more isobutene and isoamylene products, and FCC-catalyst for yielding more gasoline and light cycle oil from heavy oil or residual feedstock, and also as adsorbents or catalyst carriers.

17 Claims, No Drawings

PILLARED CLAY CATALYSTS FOR HEAVY OIL CATALYTIC PYROLISIS PROCESS AND THE PREPARATION METHOD THEREOF

BACKGROUND OF THE INVENTION

1. Field of the Invention

The present invention relates to catalysts for hydrocarbon conversion. More particularly, the invention relates to pillared clay catalysts for catalytic pyrolysis of heavy oil or residual feedstock to give the maximum yield of ethylene, propylene and butylene products and to their preparation method and application.

2. Description of Prior Art

Light olefins, including ethylene as a principal variety of the kind, are important industrial chemicals, for which the demand is increasing steadily. In the prior art, ethylene was mainly produced by means of thermal cracking process from light oil feedstock, while propylene and butylene were mainly prepared by fluid catalytic cracking (FCC) process with solid acidic catalysts.

Catalytic pyrolysis process (CPP) with heavy oil or residual feedstock is actually an art of introducing catalyst into the thermal cracking process. By the CPP process, heavy oil or residual feedstock can be converted into at relatively high yield of ethylene and propylene products at a reaction temperature lower than that of the prior thermal cracking process. The catalysts used for catalytic pyrolysis processes need to have not only the essential properties, such as good attrition resistance index and appropriate bulk density, possessed by the commercial FCC catalyst but also the distinguishing characteristics superior to the conventional FCC catalyst as follows:

(1) High Hydrothermal Stability

The reaction temperature for conventional FCC process is 460° C.–520° C., and reaction for thermal cracking process is 550° C.–800° C. Although the reaction temperature for CPP is lowered because of the use of the catalyst, it is still in the range of reaction temperatures for thermal cracking process Therefore, the catalysts used for CPP need to have high hydrothermal stability.

(2) High Converting Activity for Cracking Heavy Oil or Residual Feedstock

As the CPP technique is a process of cracking heavy oil to obtain ethylene and propylene products, the catalysts used for the process need to have high catalytic cracking activity that can convert effectively heavy oil or residual feedstock into light olefins.

(3) Good Light Olefin Selectivity

The catalysts used for CPP need to have high yields of ethylene, propylene and butylenes, low yield of dry gases and adequate coke yield to maintain thermal equilibrium of reaction and regeneration units.

The prior catalysts containing pillared clays reported in the literature are all FCC catalysts used for carbonium-ion reaction but none for the catalytic pyrolysis reaction. For example, a pillared clay catalyst reported in the Chinese patent of CN1107080A is for use in the conventional FCC process to yield more isobutene and isoamylene products (MIO catalyst). In the catalyst of the prior art, pillared rectorites prepared with a pillaring agent having a OH/Al gram mole ratio of 2.0 was used as activity component. Although the pillared clay component could improve the activity of the catalyst, it had in the meantime an adverse effect on the attrition resistance of the catalyst, hence the content of pillared clay in the catalyst of the patent is limited to less than 50 wt %. As the amount of the active component cannot be increased, consequently, the stable activities of the prior catalyst can hardly be improved. Also, in the patent the attrition resistance index data are not shown, and it implies that the attrition resistance of the prior pillared clay catalysts is inferior to commercial FCC catalysts. The prior catalysts are not catalytic pyrolysis catalysts with high stable activities and good attrition resistance index, therefore they cannot be commercialized.

The Chinese patent ZL CN 96103411.4 of the present applicant discloses a poly (vinyl alcohol) modified pillared clay catalyst for yielding more light olefin products. However, it is rather a MIO catalyst used for conventional FCC process to produce isobutene and isomyalene, than catalytic pyrolysis catalyst used for CPP to produce ethylene and propylene. In the catalyst, polyvinyl alcohol-modified pillared clay vinyl alcohol can improve the activity of catalyst, but at the same time has negative effect on the attrition resistance index of the catalyst. In the patent there is also no data about attrition resistance index and catalytic pyrolysis properties of the catalyst, this implies that the catalyst does not possess good attrition resistance index and catalytic pyrolysis properties. It is impossible to withstand the severity of CPP. Up to now the catalyst has not been commercialized.

In the Chinese patent of Z L 92109775.1 the present applicant disclosed a CCP method for petroleum hydrocarbon, wherein a pillared clay catalyst for conventional catalytic cracking process, CRP-1 (commodity trademark) catalyst and a mixture of the above two catalysts were used. Among them, the pillared clay catalyst was a pillared rectorite catalyst containing 5 wt % USY molecular sieves prepared according to the process disclosed in Z L CN 87104718, which was only a conventional FCC catalyst; and the CRP-1 catalyst was prepared by using high silicon pentasil structure zeolites containing rare earth in framework (CN 1058382A), which was also used in conventional FCC process to yield more light olefin products. Although the pillared clay catalyst of the patent had an ethylene yield of over 20 wt % and the total $C_2^=$—$C_4^=$ yields of around 50 wt % at an average reaction temperature of 700° C., it did not result from the catalyst after the deactivating treatment at 790° C. or 800° C. for 17 hours with 100% steam. Instead, only the performance of the catalyst treated at 760° C. for 6 hours with 100% steam, indicated that the hydrothermal stability of the catalyst is impossible to meet the severity of the CPP. Up to now, no catalytic pyrolysis catalyst with good attrition resistance index, high hydrothermal stability and good selectivity to ethylene and propylene is reported in any of the prior art.

SUMMARY OF THE INVENTION

An object of the present invention is to provide a series of pillared clay catalysts that can be used in catalytic pyrolysis process for cracking heavy oil or residual feedstock to yield more ethylene, propylene and butylene products. The said catalysts comprise pillared clays with high alkalized degree, molecular sieves, matrix, bonding agents and modifying compositions. The catalysts have excellent hydrothermal stability, high catalytic activity for converting heavy oil or residual feedstock, good selectivity to light olefins, adequate coke yield and attrition resistance index and apparent bulk density in accordance with demands of FCC catalyst as well.

Another object of the present invention is to provide a method for preparation of the catalysts comprising the steps of mixing slurries of all the components of said catalysts, spray drying to form microspheric shapes, preparing pillaring agents with high alkalized degree, pillaring reaction and adding modifying components.

A further object of the present invention is to provide applications of the said catalyst products. The catalysts of the present invention are suitable for use as catalysts for hydrocarbon conversion, including CPP catalyst for producing ethylene and propylene, MIO catalyst for maximum isobutene and isoamylene yields, and FCC catalyst for cracking heavy oil or residual feedstock into gasoline and light cycle oil. Besides, the catalysts of the present invention can also be used as adsorbents and catalyst supports.

DETAILED DESCRIPTION OF THE INVENTION

The catalysts of the present invention comprise the following compositions:

1. 30–75 wt % pillared clay compositions prepared by aluminum pillaring agents of high alkalized degree;
2. 10–40 wt % Bonding agent compositions of inorganic oxides
3. 0–30wt % High silicon zeolites with pentasil structure or y-type zeolites or mixtures thereof.
4. 0–10 wt % Modified compositions; and
5. 0–50 wt % Kaoinite matrix compositions.

Herein the pillared clay compositions with high alkalized degree are important active components of the catalysts for converting heavy feedstock. The special pillared clay compositions have excellent hydrothermal stability. They are aluminum pillared clays that take a polymerized aluminum chlorohydroxide or aluminum-sol with a mole ratio of OH/Al up to around 2.5 as precursor of propped pillars between two near 2:1 clay layers. Herein said clays are selected from a naturally occurring or chemically synthesized group consisting of swelling regular interstratified mineral clay or swelling single mineral clay series including rectorites or smecites, preferably rectorites and smectites. Their structural characteristics are described in the ZL CN 87104718.

Herein the bonding agents of inorganic oxides are formed by drying and calcining sol or gel substances containing aluminum, silicon, zirconium or mixtures thereof or the above mentioned substances modified by compounds containing phosphorus or polyethylene glycol. The said sol or gel substances are preferably aluminum-sol or pseudoboemite-sol or gel or the mixtures thereof, or that modified by polyethylene glycol.

Herein the said high silicon zeolites of pentasil structure or Y-type zeolites are auxiliary active components used for promoting the selectivities to light olefins and the catalytic activities of catalysts. The high silicon zeolites of pentasil structure are selected from ZSM-5 or ZRP series, which have similar pentasil structures and high hydrothennal stability. The pentasil zeolites are preferably ZRP series zeolites or ZSM-5 zeolites the derivatives of ZRP modified by compounds containing phosphorus (P) or magnesium (Mg) or aluminum (Al) or potassium (K) or tin (Sn) or the compounds or mixtures thereof. The Y-type zeolites are selected from a group consisting of REY, USY, REUSY zeolites or their derivatives modified by the compounds containing P, Mg, Al, K or Sn. The Y-type zeolites are able to enhance stability and activity of the catalysts.

Herein the predecessor of the said modifying components are selected from a group consisting of compounds containing P or Mg or Al or K or Sn or the mixtures or compounds thereof or polyethylene glycol. The modifying components containing P or Mg or Al or K or polyethylene glycol are used to improve the attrition resistance index and light olefin selectivity of the catalysts. The modifying components containing Sn can enhance hydrothermal stability of the catalysts.

The kaolinite matrix is preferably halloysites from the kaolin family.

The catalysts of the present invention are prepared by the steps of mixing the pillared clay, bonding agent, zeolites and kaolinite matrix from the kaolin family in the desired amounts to obtain a slurry, spray drying to form microspheric shapes, pillaring reaction and adding modifying components. The detailed preparation steps are as follows:

1. Mixing and spray drying to form microspheric semi-finished products
   (1) Changing Ca-type swelling mineral clays as starting raw into Na-type or RE-type swelling mineral clays by means of conventional ion exchange method;
   (2) Mixing the Na or RE-type swelling mineral clays, predecessor of bonding agents, zeolites, kaolinite matrix from kaolin family and deionized $H_2O$ in preset amounts quired quantity and spray-drying to form microspheric semi-finished products.
2. Pillaring Reaction and Aging Process
   (1) Diluting commercially available aluminum-sol or polymerized aluminum chlorohydroxide prepared by prior method (according to U.S. Pat. No. 4,176,090 or U.S. Pat. No. 4,248,739) to 10–100 mmol Al/L and then aging at 65–75° C. for 2–12 hours and holding a pH of 5–6 by dropwise addition of $NH_4OH$ or NaOH aqueous solution as needed, and then aging the resulting solution at room temperature for 2–12 hours. Thereby the high alkalized pillaring agent with OH/Al mole ratio of 2.5 is successfully obtained.
   (2) Adding the RE-rectorites or Na-rectorites to the pillaring agent according to load ratio of 2.0–10.0 milligram atom aluminum per gram clay and aging the reaction mixtures at 65–75° C. for 2–3 hours while holding the pH of 5–6 by dropwise addition of $NH_4OH$ aqueous solution. Followed by filtering, washing and drying by conventional method and calcinating at 650° C. for 1–3 hours.
3. Adding the Modifying Components
   (1) Polyethylene glycol, as a modifying component, can be added at the mixing slurry step before spray drying or at pillaring reaction or aging process after spray drying to form microspheric shapes.
   (2) Compounds containing P or Mg or Al or K or Sn, as modifying components, can be added to the catalysts by impregnating zeolites before mixing and spray drying or impregnating microspheric catalysts after pillaring reaction and calcination with solutions containing the above modifying components. The impregnating solution contain the modifying components with a concentration of 0.1–5 gram per liter.

Herein said pillared clays, as starting raw, a naturally occurring or chemically synthesized group of swelling regular interstratified mineral clays, including rectorites or swelling single mineral clay sequences including smectites. The said clays are preferably rectorites or smectites whose structural characteristics are shown in the ZL CN 87104718.

The said bonding agents are inorganic oxides formed by drying and calcinating sol and get substance, which is selected from sol and gel substance containing aluminum or silicon or zirconium, or mixture thereof, or derivatives thereof modified by phosphorus-containing compounds or polyethylene glycol, preferably selected from aluminum-sol or pseudoboemite-sol or gel or mixture thereof or derivatives thereof modified by polyethylene glycol or combination thereof.

Herein the said modifying components are preferably selected from a group consisting of commercial available phosphates containing Mg, Al, K or $SnCl_2$ aqueous solution with chlorhydric acid or compounds formed by reacting phosphoric acid ($H_3PO_4$) with $Mg(OH)_2$, $Mg(A)_2$, $MgCl_2$ or KOH or aluminum-sol.

The outstanding features of the present invention as compared with the prior arts are as follows:

1. The catalyst products provided by the present invention have the best ingredients and performance of the catalytic pyrolysis catalysts. The special pillared clays with high alkalized degree (OH/Al ration of around 2.5) in the ingredients of the catalysts are adopted as the principal active component. They have excellent hydrothermal stability, high catalytic activity for cracking heavy oil or residual feedstock and low hydrogen transfer activity that are advantageous to retain the olefins. So, the catalysts provided by the present invention are much better than that of Y-zeolite catalysts used currently extensively in most refineries in respect to meeting the requirement of the catalytic pyrolysis process. The ZRP of ZSM-5 series zeolite compositions im the ingredients of catalysts impart to the said catalysts much better light olefin selectively than that of the conventional cracking catalysts. Especially, ZRP series of ZSM-5 zeolite compositions combined with modifying components can further enhance light olefin yield and hydrothermal stability as well. So, after sever hydrothermal deactivating treatment the products of the present invention retain still high olefin yield. Also, owing to the use of bonding agents modified by polyethylene glycol or compounds containing phosphous in preparation of the catalysts, the good attrition resistance index of the catalyst is easily obtained. Therefore, in the case of increasing the contents of pillared clays and zeolites in the catalysts, the catalysts can still maintain adequate attrition resistance index as good as commercial catalysts. The rational ingredients of the catalysts in the present invention result in excellent performances of the catalyst. After aging and deactivating treatment at 790° C. for 14 hours with 100% steam, the catalysts give an ethylene yield of 21.2 wt %, a propylene yield of 22.2 wt %, and the total $C_2^=$—$C_4^=$ yields of 54.0 wt % under the evaluation conditions of an average reaction temperature of 700° C., catalyst to oil ratio of 10, weight hourly space velocity (WHSV) of 10 hours $^{-1}$, water injecting quantity to feedstock of 80 wt %. However, only under easing deactivation treatment conditions into steam treatment at 760° C. for 6 hours can the prior catalyst give an ethylene yield of 21.0 wt %, a propylene yield of 18.0 wt %, and the total $C_2^=$—$C_4^=$ yields of 50 wt %. Apparently, the catalysts of the present invention have stable activity and light olefin selectively much better than that of prior catalysts. hydrogen transfer activity that are advantageous to retain the olefins. So, the catalysts provided by the present invention are much better than Y-zeolite catalysts used currently extensively in most refineries in respect of meeting the requirement of catalytic pyrolysis process. The ZRP or ZSM-5 series zeolite impart the said catalysts much better light olefin selectivity than that of the conventional cracking catalysts. Especially, when ZRP series or ZSM-5 zeolite compositions are used in combination with modifying components light olefin yield and hydrothermal stability can be further enhanced as well. So, after severe hydrothermal deactivating treatment the products of the present invention retain still high light olefin yield. Also, owing to the use of bonding agents modified by polyethylene glycol or compounds containing phosphorus in preparation of the catalyst, the good attrition resistance index of the catalyst is easily obtained. Therefore, in the case of increasing the contents of pillared clays and zeolites in the catalysts, the catalysts can still maintain adequate attrition resistance index as good as commercial catalysts. The rational ingredients of the catalysts in the present invention result in excellent performances of the catalyst. After aging and deactivating treatment at 790° C. for 14 hours with 100% steam, the said catalysts give an ethylene yield of 21.2 wt %, a propylene yield of 22.2 wt %, and the total $C_2^=$—$C_4^=$ yields of 54.0 wt % under the evaluation conditions of an average reaction temperature of 700° C., catalyst to oil ratio of 10, weight hourly space velocity (WHSV) of 10 hours$^{-1}$, water injecting quantity to feedstock of 80 wt %. However, only under easing deactivation treatment conditions into steam treatment at 760° C. for 6 hours can the prior catalyst give an ethylene yield of 21.0 wt %, a propylene yield of 18.0 wt %, and the total $C_2^=$—$C_4^=$ yields of 50 wt %. Apparently, the catalysts of the present invention have stable activity and light olefin selectivity much better than that of prior catalysts.

2. The catalyst products of the present invention have extensive uses in the petroleum refining industry. They can be used as catalysts of hydrocarbon conversion, such as catalytic pyrolysis catalyst (CCP-Cataylst), maximum isomerization olefin catalyst (MIO-catalyst) and fluid cracking catalyst (FCC-catalyst). The catalysts of the present invention may be combined with various other elements by an impregnating method to meet the need for special catalysts. The catalysts can also be combined with other catalysts for use in some processes of specific objects. The products can also be used as adsorbents and carriers. However, they are especially suitable to be used in catalytic pyrolysis processes for cracking heavy oil to give the maximum yields of ethylene, propylene and butylene products.

Preparing procedures provided by the present invention are easy to be put into effect in commercial scale. In the prior preparation method of first spray drying to form microspheric shapes and then pillaring reaction (ZLCN87105686), due to the effect of reversible solubility of Al-sol bonding agent on attrition resistance index of microspheric catalysts, after pillaring reaction have attrition resistance index of the catalysts is usually lower than that of samples before pillaring reaction. In the preparation method of the present invention, new techniques of adding polyethylene glycol to a pillaring agent or impregnating zeolites or catalysts with compounds containing phosphorus are adopted. The modifying components contribute to the improvement in the properties of Al-sol or Al-gel bonding agents. As a result, the attrition resistance index of the catalysts is improved to the level of commercial catalyst. The said method disclosed by the present invention is easy to operate and to be carried out in commercial sale.

The present method for promoting attrition resistance index of catalysts by adding polyethylene glycol or phosphorous containing compounds is also suitable for preparing other microspheric catalysts containing Al-sol or Al-gel.

The following specific examples will give further illustration of the present invention, but they do not limit the scope of the present invention.

EXAMPLE 1

This example indicates that the catalysts prepared by the method of the present invention have better performance than that of the prior catalysts in the catalytic pyrolysis process.

The naturally occurring Ca-type rectorites were eoverted into RE-type rectorites in conventional ion-exchange method under the operational conditions at room temperature for an hour according to loading weight ratio of Ca-rectorite:$RECl_3$:deionized $H_2O=1:0.05:10$.

The ZRP-1 zeolites (products of Shandong Zhoucun catalyst factory) were impregnated with an aqueous solution containing $Mg(OH)_2$ of 0.2 wt % and $H_3PO_4$ of 0.84 wt % for 15 minutes, then filtered and dried. Thereby ZRP-1 zeolites modified by compounds containing phosphorus and magnesium was obtained.

7.75 Kg RE-type rectorites having the solid content of 64.5 wt %, 7.4 Kg pseudoboehmite Al $(OH)_3$ containing $Al_2O_3$ of 33.7 wt %, 4.1 Kg slurry of said modified ZRP-1 zeolites with a solid content of 36 wt %, 0.62 Kg halloysites having solid content of 81 wt %, 0.69 Kg commercial available HCl and 18 Kg deionized $H_2O$ were mixed stirred and spray dried according to the conventional method of preparation microspheric catalysts. Thereby microspheric semi-finished products containing rectorites of 50 wt % ZRP-1 zeolites of 15 wt %, $Al_2O_3$ formed from pseudoboehmite bonding agent of 30 wt % and halloysites of 5 wt % was obtained.

The aluminum-sol with $Al_2O_3$ content of 21.8 wt % (products of Shandong Zhoucun catalyst factory) was diluted with deionized $H_2O$ to 98.6 milligram-atom aluminum per liter. The diluted solution was adjusted to pH of 5–6 with 3% $NH_4OH$ and was aged at 70° C. for 2.5 hours holing the pH of 5–6. The resulting solution was cooled overnight at room temperature. Thereby the AL pillaring agent with high alkalize degree was obtained.

1.1 kg microspheric semi-finished products was added to 19 L aluminum pillaring agent. The mixed slurry was aged at 70° C. for 2.5 hours while holding the pH at 5–6 with 3% $NH_4OH$ so that pillaring reaction and aging process were finished. Following steps include filtering, washing, drying by the conventional method and calcining for 2 hours at 650° C. Thereby the pillared rectorate catalysts containing pillared rectorites of 50 wt %, ZRP-1 zeolites of 15 wt %, $Al_2O_3$ bonding agent of 30 wt % provided in pseudoboehmite and halloysites of 5 wt % were obtained (called as sample B).

The chemical components of catalysts B measured by standard chemical method are listed in Table 1. The BET surface areas, pore volumes of the catalysts measured from low temperature $N_2$ adsorption method and the attrition resistant index measured by fluidized attrition method are listed in Table 2. Catalytic pyrolysis characteristics of the samples were evaluated by a fixed fluidized bed with operation conditions of Daqing paraffin with boiling range of 350–500° C., average reaction temperature of 700° C., catalyst to oil ratio of 10, WHSV of $10h^{-1}$, water-injecting quantity to feedstock of 80 wt %. The results are listed in Table 3. The samples were deactivated at 790° C. for 14 hours with 100% steam before evaluation The data of the previous catalyst A in the patent of ZL CN920775.1 evaluated by the same evaluation conditions as compared with samples B in present invention were also listed in Table 3.

The data in Table 2 and Table 3 indicate that the catalysts of the present invention have qualified standard attrition resistance index, apparent bulk density and good catalytic properties. After deactivation treatment at 790° C. for 14 hours with 100% steam the catalysts have an ethylene yield of 21.6 m %, propylene yield of 22.18 m % and the total yields of the ethylene propylene and butylenes of 53.96 m %. However only under easing deactivation treatment conditions into steam treatment at 760° C. for 6 hours can previous catalysts have ethylene yield of 21.12 m % propylene yield of 18.01 m % and the total yields of ethylene propylene and butylenes of 50.18 m %. Obviously, the catalytic activity, hydrothermal stability and light olefin selectivity of the catalysts in the present invention are much better than that of the previous catalysts.

TABLE 1

| Components | $Na_2O$ | CaO | $Fe_2O_3$ | $Re_2O_3$ | $Al_2O_3$ | $SiO_2$ | Others |
|---|---|---|---|---|---|---|---|
| Content wt % | 1.03 | 0.23 | 0.47 | 1.40 | 50.7 | 37.6 | 8.57 |

TABLE 2

| Specific Area $m^2/g$ | | Pore volume ml/g | | Attrition Resistant Index % | Apparent Bulk Density g/ml |
|---|---|---|---|---|---|
| Fresh | Steaming 800° C./4 hrs | Fresh | Steaming 800° C./4 hrs | | |
| 200 | 137 | 0.16 | 0.17 | 23 | 0.89 |

TABLE 3

| Samples Deactivating conditions | Average reaction temperature: 700° C. | |
|---|---|---|
| | Catalyst B of the present invention Steaming at 790° C., 100% steam for 14 hours | The Prior catalyst A Steaming at 760° C. for 6 hours |
| Product yield wt % | | |
| Gas | 71.56 | 65.84 |
| Gasoline | 11.87 | 21.64 |
| Light cycle oil | 4.77 | 2.69 |
| Heavy oil | 2.54 | 0.92 |
| Coke | 9.20 | 8.91 |
| Total | 100.0 | 100.0 |
| Olefin yield wt % | | |
| $C_2^=C_2^=$ | 21.16 | 21.12 |
| $C_3^=$ | 22.18 | 18.01 |
| $C_4^=$ | 10.62 | 11.05 |
| $\Sigma C_2^= \sim C_4^=$ | 53.96 | 50.18 |

EXAMPLE 2

This example shows that the catalysts modified by composition containing P and Mg composition of the present invention have high attrition resistant index, hydrothermal stability and light olefin selectivity.

The microspheric catalysts B containing pillared interlayer rectorites of 50 wt %, ZRP-1 zeolites of 15 wt %, $Al_2O_3$ formed by seudoboehmite bonding agent of 30 wt % and halloysites of 5 wt % were prepared by method described in the example 1.

192 ml commercial available $H_3PO_4$ ($H_3PO_4 < 85$ wt %) and 40 g $Mg(OH)_2$ were added to 40 L deionized $H_2O$. The mixtures were stirred until $Mg(OH)_2$ was dissolved completely.

1.1 Kg microspheric catalysts B were added to the above solution containing phosphorus and magnesium, the mixtures were stirred for 15 minutes at room temperature, filtered, and dried at 120° C. Thereby the catalysts modified by phosphorus and magnesium were obtained (abbreviated catalyst C).

The attrition resistance index and apparent bulk density of the samples measured according to methods described in example 1 are listed in Table 4. Catalytic characteristics of the samples were evaluated by fixed fluidized bed with same operation conditions as example 1 except for an average reaction temperature of 680° C. The results are listed in Table 5. The samples were deactivated at 800° C. for 17 hours with 100% steam before evaluation. In order to compare with prior catalysts, the data of the catalysts A in the previous ZL CN 92109775.1 evaluated under the same evaluation conditions are also listed in Table 5.

The results in Table 4 and Table 5 show that attrition resistance index and catalytic properties of the catalysts in the present invention are both improved evidently. When average reaction temperature is 680° C. the catalysts treated at 800° C. for 17 hours with 100% steam in the present invention have still $C_2^=$ yield of 19.5 m %, $C_2^= - C_4^=$ yields of 52.45 m % versus $C_2^=$ yields of 18.34 m % and $C_2^= - C_4^=$ yields of 46.07 m % by previous catalysts only under easy deactivation conditions into steam treatment at 760° C. for 6 hours. It is indicated that the light olefin selectivity of the catalysts in the present invention is much better than that of the previous catalysts.

TABLE 4

| Before impregnated with solution containing Mg and P | | After impregnated with solution containing Mg and P | |
|---|---|---|---|
| Attrition resistant index % | Apparent bulk density g/ml | Attrition resistant index % | Apparent bulk density g/ml |
| 3.6 | 0.89 | 2.0 | 0.89 |

TABLE 5

| Samples Deactivating conditions | Average reaction temperature: 680° C. | |
|---|---|---|
| | Catalyst C of the present invention Steaming at 800° C. for 17 hours | The Previous catalyst A Steaming at 760° C. for 6 hours |
| Product yield m % | | |
| Gas | 67.26 | 66.70 |
| Gasoline | 15.02 | 12.27 |
| Light cycle oil | 5.74 | 4.68 |
| Slurry | 4.58 | 2.93 |
| Coke | 7.40 | 13.49 |
| Total | 100.0 | 100.0 |
| Olefin yield m % | | |
| $C_2^= C_2^=$ | 19.50 | 18.34 |
| $C_3^=$ | 21.58 | 17.49 |
| $C_4^=$ | 11.37 | 10.43 |
| $\Sigma C_2^= \sim C_4^=$ | 52.45 | 46.07 |

EXAMPLE 3

This example indicates that catalysts modified by composition containing tin prepared by the method in the present invention have high hydrothermal stability and light olefin selectivity.

The microspheric catalysts B containing pillared interlayer rectorite of 50 wt %, ZRP-1 zeolites of 15 wt %, $Al_2O_3$ formed from pseudoboehmite bonding agent of 30 wt % and halloysites of 5 wt % were prepared according to the method described in example 1.

550 mL $SnCL_2HCl$ aqueous solution with Sn concentration of 2.9 g/L was diluted with deionized $H_2O$ to 5 L. 550 g microspheric catalysts B calcined for 2 hours at 650° C. were added to the tin solution. The slurry of mixture was stirred for 15 minutes at room temperature and then filtered and washed to be free of $Cl^{-1}$. The filter cake was slurried with 18 L deionized $H_2O$ again. The pH of the mixture slurry was adjusted to 5–6 with 3% $NH_4OH$. The resulting slurry was aged at 70° C. for 2.5 hours and holding the pH within the range of 5–6 and then filtered and dried. Thereby the catalysts modified by tin were obtained (called as sample D).

The results of catalytic characteristics evaluated by a fixed fluidized bed for the samples before and after modification by tin are listed in Table 6. Deactivating conditions of the samples before evaluation and evaluation reaction conditions are the same conditions as example 2.

The data in Table 6 show that after deactivating treatment at 800° C. for 17 hours with 100% steam, the catalysts D modified by tin have conversion of 88.36 m %, cracking gas yields of 65.14 m % versus conversion of 85.59 m % and cracking gas of 63.76 m % by the unmodified samples indicating that catalysts modified by tin have good hydrothennal stability.

TABLE 6

| Samples<br>Deactivating<br>conditions | Average reaction temperature 680° C. | |
|---|---|---|
| | The sample D<br>modified by tin<br>Steaming at 800° C.<br>for 17 hours | Unmodified sample B<br>Steaming at 800° C.<br>for 17 hours |
| Conversion m %<br>Product yield m % | 88.36 | 85.59 |
| Gas | 65.14 | 63.76 |
| Gasoline | 13.38 | 14.51 |
| Light cycle oil | 6.59 | 7.57 |
| Slurry | 5.05 | 6.84 |
| Coke | 9.84 | 7.32 |
| Total<br>Olefin yield m % | 100.0 | 100.0 |
| $C_2^=$ | 18.29 | 17.94 |
| $C_3^=$ | 20.10 | 20.24 |
| $C_4^=$ | 10.97 | 10.89 |
| $\Sigma C_2^=\sim C_4^=$ | 49.36 | 49.07 |

EXAMPLE 4

This example indicates that the catalysts modified by phosphorus and aluminum in the present invention have hydrothermal stability, light olefin selectivity, and attrition resistant index better then that of unmodified samples.

The microspheric catalysts B containing pillared interlayer rectorites of 50 wt %, ZRP-1 zeolites of 15 wt %, $Al_2O_3$ bonding agent formed from pseudoboehmite of 30 wt % and halloysites of 5 wt % were prepared according to the method described in example 1.

2 L aluminum-sol containing $Al_2O_3$ of 21.8% wt and 100 mL commercially available $H_3PO_4$ with 8 L deionized $H_2O$ were mixed. 1 Kg of the microspheric catalysts B calcined for 2 hours at 650° C. were added to the above solution of aluminum phosphate. The resulting slurry was stirred for 15 minutes, filtered and dried. The catalysts modified by phosphorus and aluminum provided in the present invention were obtained (called sample E).

The data about attrition resistant index, microactivity for cracking light oil and for cracking heavy oil of the modified and unmodified samples are listed in Table 7. The samples were deactivated at 800° C. for 4 hours with 100% steam before the evaluation. Evaluation conditions of feedstock of Dagang light diesel oil with boiling range from 221° C. to 349° C., reaction temperature of 500° C., catalyst to oil ratio of 3.2, WHSV of 16 h$^{-1}$ were used for evaluating microactivity for cracking light oil. The operation conditions of feedstock of Shengli vacuum paraffin with boiling range of 239–537° C., reaction temperature of 520° C., catalyst to oil ratio of 3, WHSV of 16h$^-$were used for evaluating catalytic activity for cracking heavy oil. The results evaluated by fixed fluidized bed for catalytic characteristics of the samples are listed in Table 8. Deactivating conditions of the samples before evaluation and evaluation reaction conditions are same conditions as the example 2.

TABLE 7

| Catalysts | Sample B modified<br>by phosphorus and<br>aluminum | unmodified Sample B |
|---|---|---|
| Attrition resistant index % | 2.1 | 3.3 |
| Microactivity for cracking light gas oil m % | 74 | 69 |
| Microactivity for cracking heavy oil m % | 76.4 | 72.7 |

TABLE 8

| Samples<br>Deactivating<br>conditions | Average reaction temperature: 680° C. | |
|---|---|---|
| | The sample E modified<br>by phosphorus and<br>aluminum<br>Steaming at 800° C. for<br>17 hours | The sample B<br>unmodified<br>Steaming at 800° C.<br>for 17 hours |
| Conversion m %<br>Product yield m % | 88.99 | 85.59 |
| Gas | 65.93 | 63.76 |
| Gasoline | 14.36 | 14.51 |
| Light cycle oil | 6.11 | 7.57 |
| Slurry | 4.90 | 6.84 |
| Coke | 8.70 | 7.32 |
| Total<br>Olefin yield m % | 100.0 | 100.0 |
| $C_2^=$ | 18.40 | 17.94 |
| $C_3^=$ | 20.61 | 20.24 |
| $C_4^=$ | 11.10 | 10.89 |
| $\Sigma C_2^=\sim C_4^=$ | 50.11 | 49.07 |

The data in Table 7 and Table 8 show that attrition resistant index, hydrothermal stability and light olefin selectivity of the catalysts E modified by phosphorus and aluminum have been improved

EXAMPLE 5

This example shows that according to the method in present invention adding polyethylene glycol to catalysts can effectively improve the attrition resistant index of the catalysts on premise of keeping original high cracking activity and hydrothermal stability of the catalysts.

The microspheric semi-finished product containing rectorites of 50 wt %, ZRP-1 zeolites of 15 wt %, $Al_2O_3$ formed from pseudoboehmite of 20 wt %, $Al_2O_3$ provided by aluminum-sol bonding agent of 10 wt % and halloysites of 5 wt % were prepared by means of the method described in example 1.

According to method in example 1 the pillaring agent was prepared. Followed by adding the commercial available polyethylene glycol and semi-finished product in amounts of 0.005 gram polyethylene glycol per gram rectorite clays. The reacting mixtures were aged, filtered, washed, dried and calcined for 2 hours at 650° C. according to the procedures of example 1. Thereby the catalysts modified by polyethylene glycol were obtained (called as sample F).

In order to prepare unmodified catalyst for comparison, the aluminum pillaring agent was prepared according to same procedures as samples F except that no polyethylene glycol is added.

The attrition resistant index and microactivity for cracking heavy oil of the samples modified and unmodified are listed in. Table 9. The samples were deactivated at 800° C. for 4 hours with 100% steam before evaluation. The evaluation conditions are the same conditions as example 4.

The data of Table 9 indicate that the attrition resistant index of the catalysts modified by polyethylene glycol is improved obviously in the case of keeping original high cracking activity and hydrothermal stability of catalysts.

TABLE 9

| Catalysts | Sample F modified by polyethylene glycol | unmodified Samples |
|---|---|---|
| Attrition resistant index before pillaring reaction and washing % | 1.8 | 1.8 |
| Attrition resistant index after pillaring reaction and washing % | 1.7 | 3.3 |
| Microactivity for cracking heavy oil m % | 67.0 | 68.2 |

EXAMPLE 6

This example indicates that when ZSM-5 zeolites are used as one of the activity components of catalysts in the present invention the said catalysts can also yield high $C_2^=$—$C_4^=$ products.

Using HZSM-5 zeolites (products of Shandong Zhoucun catalyst factory) instead of the ZRP-1 zeolites as the component of catalysts in example 1 and no adding halloysite component a microspheric semi-finished products containing rectorites of 50 wt %, HZSM-5 zeolites of 20 wt %, pseudoboehmite $Al_2O_3$ bonding agent of 30 wt % were prepared by method described in example 1.

The microspheric semi-finished products were added to aluminum pillaring agent. The resulting slurry was aged, filtered, washed, dried and calcined according to the procedures of example 1. The pillared clay catalysts containing ZSM-5 zeolites were obtained (called as catalysts G).

The catalytic characteristics of samples G were evaluated by a fixed fluidized bed according to operation conditions of Daqing paraffin feedstock, average reaction temperature of 700° C., catalyst to oil ratio of 6, WHSV of 10 h$^{-1}$, water injection quantity to feedstock of 80 wt %. The results are listed in Table 10. The samples were deactivated at 790° C. for 14 hours with 100% steam before evaluation.

In order to compare with prior catalysts, the catalytic characteristic evaluated under the same conditions for industrial equilibrium catalysts containing ZSM-5 zeolites (commodity trademark: CHP-1) are also listed in Table 10.

TABLE 10

| | Average reaction temperature: 700° C. | |
|---|---|---|
| Catalysts Deactivating conditions | Catalysts G containing ZSM-5 zeolites in present invention Steamed at 790° C. for 14 hours | Prior catalysts CHP-1 containing ZSM-5 zeolites Industrial equilibrium catalysts |
| Product yield m % | | |
| Gas | 67.59 | 62.75 |
| Gasoline | 15.26 | 24.81 |
| Light cycle oil | 4.66 | 4.51 |
| Slurry | 3.71 | 1.56 |
| Coke | 8.78 | 6.37 |
| Total | 100.0 | 100.0 |
| Olefin yield m % | | |
| $C_2^=$ | 16.93 | 17.25 |
| $C_3^=$ | 22.01 | 18.91 |
| $C_4^=$ | 13.16 | 12.11 |
| $\Sigma C_2^=$–$C_4^=$ | 52.10 | 48.27 |

The data of Table 10 demonstrate that the $C_2^=$—$C_4^=$ yields of the PIR catalysts G containing ZSM-5 zeolites are higher than that of the CHP-1 though deactivation conditions of the catalyst G are more severe than that of industrial equilibrium catalysts CHP-1.

EXAMPLE 7

This example shows that pillared clay catalysts without any zeolite activity composition provided by present invention still have high ethylene yield.

According to the procedures of example 1 microspheric semi-finished products containing rectorites of 75 wt % and $Al_3O_2$ bonding agent of 25 wt % were prepared by mixing raw clay of 75 wt %, $Al_3O_2$ provided by aluminum-sol of 20 wt % and $Al_2O_3$ formed from pseudoboehmite of 5 wt %, stirring and spray drying to take microspheric shapes. The microspheric shape samples were further dried at 300° C. for 0.5 hours.

The above microspheric samples were pillared with Al-pillaring agent and then aged, filtered, washed, dried and calcined according to method described in example 1. The microspheric catalysts for increasing light olefin products that contain pillared interlayer clays of 75 wt %, $Al_2O_3$ bonding agent of 25 wt % were obtained (called as catalyst H).

Catalytic pyrolysis characteristics of the samples H evaluated by using conditions in example 4 are listed in Table 11. The samples were treated at 790° C. for 14 hours with 100% steam before evaluation.

The results from Table 11 show that although the deactivated conditions of 790° C. for 14 hours with 100% steam for the catalyst H is more severe than that of CHP-1 equilibrium catalysts, its ethylene yield (18.48 m %) is higher that that (17.25 m %) of the CHP-1 in Table 10.

TABLE 11

| | Product yield m % | | | | | Olefin yields m % | | | |
|---|---|---|---|---|---|---|---|---|---|
| Gas | Gasoline | LCO | Slurry | Coke | Total | $C_2^=$ | $C_3^=$ | $C_4^=$ | $\Sigma C_2^= - C_4^=$ |
| 65.33 | 17.86 | 4.38 | 2.63 | 9.80 | 100 | 18.85 | 17.21 | 11.40 | 47.46 |

EXAMPLE 8

This example indicates that catalysts provided by present invention can be used as not only catalytic pyrolysis catalysts but also maximum isomeric olefin (MIO) catalysts.

The catalytic pyrolysis catalysts containing pillared interlayer rectorites of 50% wt, ZRP-1 zeolites of 15% wt, $Al_2O_3$ bonding agent of 30% wt and halloysites of 5 wt % were prepared by the method described in example.

1. The catalytic cracking properties of the samples for cracking heavy oil were evaluated by a microactivity test unit with operation conditions of feedstock of Shengli vacuum paraffin with a boiling range of 239–537° C., reaction temperature of 520° C., catalyst to oil of 3.2, and WHSV of 16 $h^{-1}$. The results are listed in Table 12. The samples were deactivated at 800° C. for 4 hours with 100% steam before evaluation. In order to compare with prior MIO catalyst, the isomeric olefin selectivity of typical industrial catalysts (commodity trademark: CRP-1) evaluated under the same conditions are also listed in Table 12.

The results of Table 12 show that catalytic pyrolysis catalysts prepared by the method described in example 1 have iso-butene and iso-amylene yields much better than that of prior catalysts CRP-1 in a catalytic cracking process. In other words, the catalysts of the present invention can be used as not only catalytic pyrolysis catalysts but also as MIO catalyst for maximizing iso-butene and iso-amylene production.

TABLE 12

| | Reaction temperature: 520° C. | |
|---|---|---|
| Samples Deactivating conditions | The catalysts B in present invention Steaming at 800° C. for 4 hours | Prior catalysts CRP-1 Industry equilibrium catalysts |
| Conversion m % | 68.2 | 56.0 |
| Product yield m % | | |
| Gas | 39.9 | 29.3 |
| Coke | 1.8 | 1.7 |
| Gasoline | 26.5 | 25.0 |
| Diesel | 17.9 | 18.4 |
| Slurry | 13.9 | 25.6 |
| Olefin yield m % | | |
| $C_2^=$ | 1.44 | 0.98 |
| $C_3^=$ | 14.43 | 9.98 |
| $C_4^=$ | 15.39 | 11.73 |
| $C_5^=$ | 7.30 | 6.70 |
| $\Sigma C_2^= \sim C_5^=$ | 38.56 | 29.39 |
| Isomeric olefin yield m % | | |
| $iC_4^=$ | 6.29 | 4.64 |
| $iC_5^=$ | 5.06 | 4.69 |
| $\Sigma iC_4^= \sim iC_5^=$ | 11.35 | 9.33 |

EXAMPLE 9

This example indicates that a fluid cracking catalyst for converting heavy oil into more gasoline and light cycle oil can be prepared by the method of the present invention when the ingredient was adjusted in the range of the present invention.

According to loading weight ratio of REUSY zeolites:$KH_2PO_4$:deionized $H_2O$=1:0.88:15, REUSY type zeolites (products of Shandong Zhoucun catalyst factory) was modified by compounds containing phosphorus in the conventional ion exchange method. The modified REUSY zeolites contain P of 3.5 wt % and $K_2O$ of 2.1 wt %.

Using REUSY zeolites modified by $KH_2PO_4$ instead of the ZRP-1 zeolites and adjusting ingredient in example 1 a FCC catalyst was prepared by method described in example 1. The microspheric catalyst contains pillared interlayer rectorite of 60 wt %, modified REUSY zeolites of 15 wt %, $Al_2O_3$ formed from pseudoboehmite bonding agent of 25 wt %. It is called as sample I.

The chemical components and physical properties of the catalysts measured by method described in example 1 are listed in Table 13 and Table 14. Microactivity of cracking heavy oil at different reaction temperature for the samples were evaluated by method in example 4 with evaluation conditions of 923VGO feedstock with boiling a range of 227~475° C., catalyst to oil of 3.2, WHSV of 16 $h^{-1}$, reaction temperature of 482° C. or 520° C. The results are listed in Table 15 and Table 16. The samples were deactivated at 800° C. for 4 hours with 100% steam before evaluation.

The data in Table 15 show that although the catalyst I of present invention contains zeolite content which is lower than that of prior commercial FCC catalysts, it has still high total conversion, low bottom and high gasoline yields. The results in Table 16 indicate further that when catalysts I contains same zeolite content as the prior commercial RHY catalysts the pillared clay catalysts I of the present invention have catalytic cracking activity, selectivities of gasoline and light cycle oil much better than that of the prior catalysts. Obviously, the pillared interlayer catalysts of the present invention are a class of new cracking catalysts that can effectively convert heavy oil into maximum gasoline and light cycle oil products.

TABLE 13

| Components | Na₂O | CaO | Fe₂O₃ | Re₂O₃ | MgO | Al₂O₃ | SiO₂ | P | K₂O |
|---|---|---|---|---|---|---|---|---|---|
| Content m % | 0.95 | 1.70 | 0.44 | 1.30 | 0.15 | 55.7 | 38.8 | 0.57 | 0.63 |

TABLE 14

| Surface Area m²/g | | Pore volume ml/g | | Attrition Resistant Index % | Apparent Bulk Density g/ml |
|---|---|---|---|---|---|
| Fresh | Steaming 800° C./4 hrs | Fresh | Steaming 800° C./4 hrs | | |
| 250 | 132 | 0.17 | 0.15 | 2.3 | 0.76 |

TABLE 15

Reaction Temperature: 482° C.

| Catalysts | Conversion m % | Product yield m % | | | | | Light oil yield m % |
|---|---|---|---|---|---|---|---|
| | | Gas | gasoline | LCO | bottom | coke | |
| Catalyst I in present invention containing REUSY of 15% | 70 | 13.4 | 52.9 | 21.5 | 8.1 | 3.8 | 74.4 |
| Prior commercial catalyst containing USY of 35% | 66.9 | 14.4 | 50.8 | 22.8 | 10.6 | 1.7 | 73.6 |

TABLE 16

Reaction Temperature: 520° C.

| Catalysts | Conversion m % | Product yield m % | | | | | Light oil yield m % |
|---|---|---|---|---|---|---|---|
| | | Gas | gasoline | LCO | bottom | coke | |
| Catalyst I in present invention containing RHY of 15% | 78 | 16.3 | 56.4 | 16.8 | 5.2 | 5.3 | 73.2 |
| Early commercial catalysts containing RHY of 15% | 70.9 | 20.2 | 47.9 | 15.3 | 13.8 | 2.8 | 63.2 |

EXAMPLE 10

This example shows that the pillared clay catalysts prepared according to the method in present invention that contain ZRP-1 and REUSY zeolites modified by compounds containing phosphorus have not only qualified standard attrition resistant index and apparent bulk density, but also high catalytic activity, excellent hydrothermal stability and good light olefin selectivity in light olefin production.

According to loading weight ratio of zeolites:KH₂PO₄:deionized: H2O=1:0.088:15, the ZRP-1 and the REUSY zeolites were respectively modified by conventional ion exchange method with operation conditions of 90° C. for 1 hour and holding the pH within a range 3.0~3.5. Thereby modified ZRP-1 containing P of 1.9 wt %, K₂O of 1.1 wt % and modified RE-USY zeolites containing P of 3.5 wt %, K₂O of 2.1 wt % were respectively obtained.

3.9 Kg of RE-type rectorite clays having a solid content of 63.5 wt %, 0.8 Kg modified ZRP-1 zeolites with a solid content of 93.5 wt %, 0.28 Kg modified REUSY zeolites containing a solid content of 91.0 wt %, 4.5 Kg pseudoboehmite having an Al₂O₃ content of 33.33 wt %, 0.35 Kg HCl (commercially available) and 8.2 Kg deionized H₂O were mixed, stirred and spray dried to take microspheric shapes by the method described in example 1. The microspheric pillared clay catalysts containing pillared interlayer rectorites of 50 wt %, modified ZRP-1 zeolites of 15 wt %, modified RE-USY zeolites of 5 wt %, Al₂O₃ bonding agent formed from pseudoboehmite of 30 wt % were obtained (Called sample J). The chemical components for the catalyst measured by the standard chemical method are listed in Table 17.

TABLE 17

| Components | Na₂O | CaO | Fe₂O₃ | Re₂O₃ | MgO | Al₂O₃ | SiO₂ | P | K₂O | others |
|---|---|---|---|---|---|---|---|---|---|---|
| Content m % | 0.86 | 1.50 | 0.41 | 0.57 | 0.24 | 58.1 | 33.0 | 0.42 | 0.47 | 4.43 |

The physical properties of the catalyst measured by the method of example 1 are listed in Table 18.

TABLE 18

| Surface Area m²/g | | Pore volume ml/g | | Attrition Resistant Index % | | Apparent Bulk Density g/ml |
|---|---|---|---|---|---|---|
| Fresh | Steaming 800° C./4 hrs | Fresh | Steaming 800° C./4 hrs | Before pillaring reaction | After pillaring reaction | |
| 245 | 130 | 0.16 | 0.16 | 2.1 | 3.2 | 0.81 |

Microactivity of the samples for cracking light gas oil was evaluated by MAT for light oil method in example 4 with evaluation conditions of feedstock of Dagang light diesel oil (221–349° C.), reaction temperature of 500° C., catalyst to oil ratio of 3.2, WHSV of 16 h⁻¹. The results were listed in Table 19. The catalytic activity of the samples for cracking heavy oil and the selectivities of isobutene and isoamylene are evaluated by microactivity test for cracking heavy oil in example 4 with evaluation conditions of Shengli vacuum paraffin feedstock with boiling range of 239–537° C., reaction temperature of 520° C., catalyst to oil ratio of 3, WHSV of 16 h⁻¹. The results are listed in table 20. Catalytic pyrolysis characteristics of the samples were evaluated by fluidized bed method in example 1 with evaluation conditions of mixed feedstock of 45% Daqing paraffin and 55% Daqing vacuum residual, average reaction temperature of 663° C., catalyst to oil of 15, WHSV of 10 h⁻¹, water injection quantity to feedstock of 50%. The results are listed in table 21. The samples were treated at 790° C. for 14 hours with 100% steam before evaluation.

The data in Table 17~21 indicate that although the content of zeolites in the catalysts was increased the pillared clay catalysts J of the present invention have still good attrition resistant index. Especially the catalysts have considerable high microactivity for cracking light oil and for cracking heavy oil in the FCC process, high isobutene and isoamylene yields in the Maximizing isomeric olefin process, and high total conversion and $C_2^= - C_4^=$ yields in the catalytic pyrolysis process. The pillared clay catalyst J containing ZRP-1 and Y both zeolites have catalytic activity hydrothermal stability and olefin selectivity mach better than that of the catalyst only containing a ZRP-1 zeolite.

TABLE 19

Reaction Temperature: 500° C.

| Catalyst Deactivating conditions | PIR Catalysts J containing Y and ZRP-1 zeolites Steaming 800° C./4 hrs | PIR Catalysts containing ZRP-1 zeolites Steaming 800° C./4 hrs |
|---|---|---|
| Microactivity for light gas oil | 70 | 60 |

TABLE 20

Reaction Temperature: 520° C.

| Catalysts* | Conversion m % | Product yield m % | | | | Olefin Yield m % | | |
|---|---|---|---|---|---|---|---|---|
| | | Gas | gasoline | LCO | bottom | coke | $iC_4^=$ | $iC_5^=$ | $\Sigma iC_4^=\sim iC_5^=$ |
| PIR Catalyst J containing Y and ZRP1 zeolites | 77.5 | 41.3 | 32.9 | 14.8 | 7.7 | 3.3 | 6.2 | 8.2 | 14.4 |
| PIR Catalyst containing ZRP-1 zeolites | 71.6 | 38.5 | 29.6 | 16.5 | 11.9 | 3.5 | 6.2 | 6.1 | 12.3 |

*The catalyst were deactivated at 800° C. for 4 hours with 100% steam.

The catalysts were deactivated at 800° C. for 4 hours with 100% steam.

TABLE 21

Average Reaction Temperature: 663° C.

| Catalysts | PIR catalyst J Containing ZRP-1 and Y zeolites | PIR catalyst containing ZRP-1 zeolites |
|---|---|---|
| Product yield m % | | |
| Dry gas | 29.22 | 28.91 |
| LPG | 37.27 | 36.69 |
| Gasoline | 12.47 | 11.85 |
| Light cycle oil | 3.26 | 3.93 |
| Slurry | 1.45 | 2.35 |
| Coke | 16.33 | 16.22 |
| Total | 100.00 | 100.00 |
| Conversion m % | 95.29 | 93.72 |
| Olefin yield m % | | |
| $C_2^=$ | 16.69 | 16.47 |
| $C_3^=$ | 22.92 | 22.32 |
| $C_4^=$ | 11.45 | 11.79 |
| $\Sigma C_2^= - C_4^=$ | 51.06 | 50.58 |

What is claimed is:

1. A class of pillared clay catalytic pyrolysis catalysts characterized in that:

(1) said catalyst compositions comprise pillared clays of 30–75 wt %, inorganic oxide bonding agents of 10–40 wt %; silicon containing zeolites with pentasil structure or Y-zeolites or their mixtures of 0–30 wt %; modification components of 0–10 wt % and kaolin family clays as a matrix of 0–50 wt %;

(2) wherein said pillared clays are aluminum pillared clays with an OH/Al ratio of about 2.5 and are prepared by using a polymerized aluminum chlorohydroxide or an aluminum-sol with an OH/Al mole ratio up to about 2.5 as a precursor of propped pillars between two adjacent 2:1 clay layers;

(3) wherein said bonding agents are inorganic oxides formed by drying and calcining sol and gel substances, which are selected from sol and gel substances containing at least one of aluminum, silicon or zirconium, or derivatives of said sol and gel substances modified by at least one of phosphorus containing compounds or polyethylene glycol;

(4) wherein said zeolites are unmodified or modified zeolites comprising at least one selected from the group consisting of ZRP series zeolites, ZSM-5 zeolites and Y zeolites; and (5) wherein said modification components are a class of substances whose precursor is at least one selected from the group consisting of Mg, Al, K, P, Sn and polyethylene glycol.

2. The catalysts according to claim 1, wherein a starting raw material for the pillared clays comprises at least one selected from the group consisting of rectorites and smectites.

3. The catalysts according to claim 1, wherein said binding agents are inorganic oxides formed by drying and calcining at least one selected from the group consisting of aluminum-sol, aluminum-gel, pseudoboehmite-sol and pseudoboehmite-gel or derivatives thereof modified by polyethylene glycol or phosphorus-containing compounds.

4. The catalysts according to claim 1, wherein the catalysts have a $C_2$–$C_4$ olefin yield of about 38.56%–53.96%.

5. The catalysts according to claim 1, wherein the catalysts have an attrition resistance index of about 1.7–3.

6. A method for preparing the pillared clay catalysts according to claim 1, which comprises:

(1) preparing pillaring agents with an OH/Al ratio of about 2.5 by heating an Al-sol or a polymerized aluminum chlorohydroxide solution, which is diluted to a concentration of less than 1000 milligram-atom Al per liter, at 65–75° C. for 1–3 hours and holding a pH range of 5.0–6.0 with a dropwise addition of an $NH_4OH$ aqueous solution as needed, thereby obtaining the pillaring agents;

(2) mixing and slurrying RE or Na-exchanged layered clays, precursor substances of bonding agents, zeolites, a kaolinite matrix and deionized water according to a required ratio and then spray drying to form microspheric semi-finished products;

(3) pillaring the microspheric semi-finished products into the pillared clay catalysts by adding the semi-finished products to Al-pillaring agents with an OH/Al ratio of about 2.5 according to a load ratio of 2.0–10.0 milligram atom aluminum per gram clay, to carry out the pillaring reaction by stirring at 65–75° C. for 2–3 hours, while holding the pH at 5–6 with the $NH_4OH$ aqueous solution, and filtering, washing and drying followed by calcining at 650° C. for 1–3 hours; and (4) adding at least one of the modifying components, wherein if the modifying component is ethylene glycol, then the ethylene glycol is added during the mixing and slurrying step (2) before spray drying or during the pillaring step (3), and wherein if the modifying component is Mg, Al, K, P or Sn, then the Mg, Al, K, P or Sn is added before the mixing and slurrying step (2) or after the pillaring followed by calcining step (3).

7. The method according to claim 6, wherein said layered clays are at least one selected from the group consisting of rectorites and smectites.

8. The method according to claim 6 wherein said precursor substances of the bonding agents are a sol or gel comprising at least one selected from the group consisting of Al, Si and Zr or derivatives thereof modified by polyethylene glycol or compounds containing phosphorus.

9. The method according to claim 6, wherein said precursor substances of the bonding agents are at least one selected from the group consisting of aluminum-sol, aluminum-gel, pseudoboehmite-sol and pseudoboehmite-gel or derivatives thereof modified by polyethylene glycol or compounds containing phosphorous.

10. The method according to claim 6, wherein said zeolites are unmodified or modified zeolites comprising at least one selected from the group consisting of ZRP series zeolites, ZSM-5 zeolite and Y series zeolites.

11. The method according to claim 6, wherein said kaolinites are halloysites from the kaolin family.

12. The method according to claim 6, wherein said aluminum pillaring agents with an OH/Al gram mole ratio of around 2.5 are prepared by diluting the polymerized aluminum chlorohydroxide solution or Al-sol to a concentration of 10–100 mmol Al per liter and then heating the solution at 65–75° C. for 2–12 hours while holding the pH at 5–6 with the $NH_4OH$ aqueous solution, and followed by aging at room temperature for 2–12 hours.

13. The method according to claim 6, wherein said modifying component is polyethylene glycol which is added either during the mixing and slurrying process before spray drying to form microspheric products or at the pillaring reaction after spray drying; and the modifying components contain at least one selected from the group consisting of Mg, Al, K, P and Sn, and the modifying components are impregnated upon the ZRP series or ZSM-5 or Y-type zeolites, or upon the pillared clay catalysts after the pillaring reaction and calcinaton.

14. The method according to claim 6, wherein in the step (1) the aluminum chlorohydroxide solution has less than 100 milligram-atom Al per liter.

15. A hydrocarbon conversion process comprising:
providing at least one of the catalysts of claim 1;
contacting a heavy oil with the catalyst; and
catalytically pyrolyzing the heavy oil into ethylene propylene products.

16. A hydrocarbon conversion process comprising:
providing at least one of the catalysts of claim 1;
contacting a heavy oil feedstock with the catalyst; and
cracking heavy oil feedstock to give maximum yields of isobutene and isoamylene products.

17. A hydrocarbon conversion process comprising:
providing at least one of the catalysts of claim 1;
contacting a heavy oil with the catalyst; and cracking the heavy oil into gasoline and light cycle oil.

* * * * *